Oct. 14, 1969  C. B. PETERSON, JR  3,472,119
THREAD FORMING SCREW AND METHOD OF MAKING SAME
Filed June 29, 1966
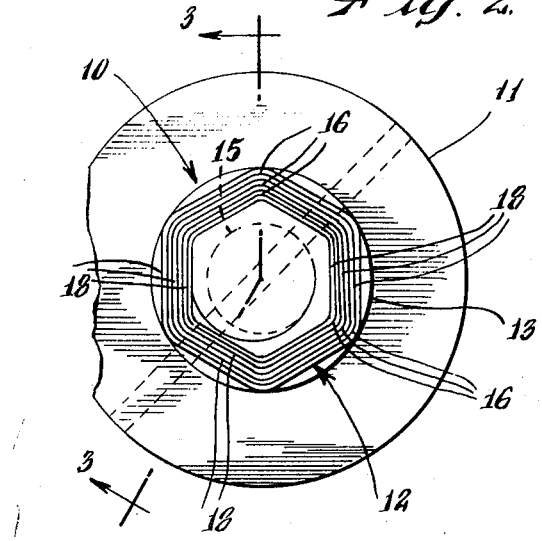
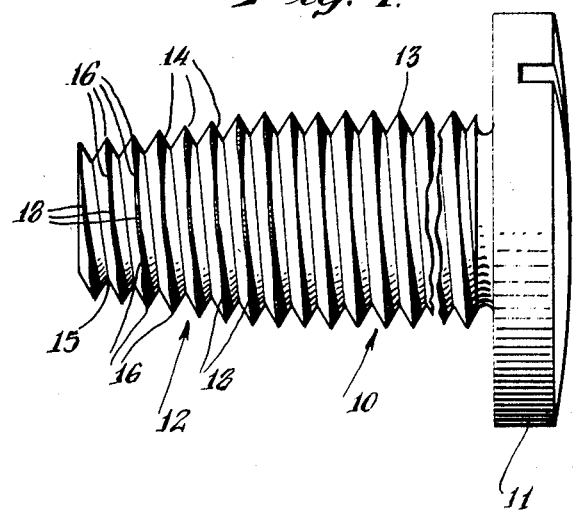
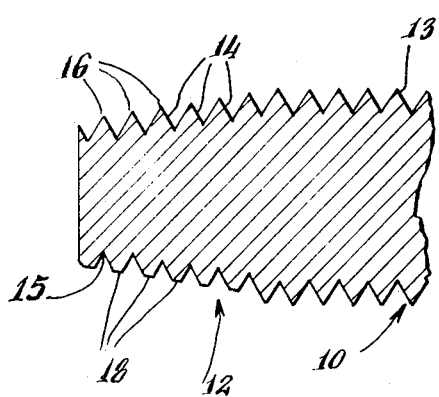
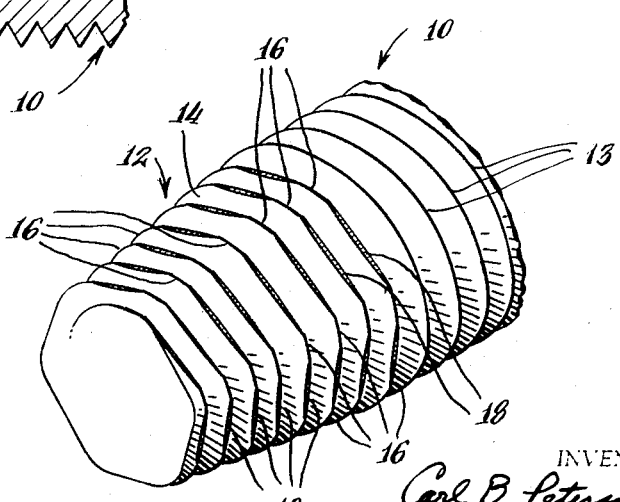
INVENTOR.
Carl B. Peterson, Jr.
BY
Wooster, Davis & Cifelli
ATTORNEYS.

United States Patent Office 3,472,119
Patented Oct. 14, 1969

3,472,119
THREAD FORMING SCREW AND METHOD
OF MAKING SAME
Carl B. Peterson, Jr., Fairfield, Conn., assignor to Harvey
Hubbell Incorporated, Bridgeport, Conn., a corporation
of Connecticut
Filed June 29, 1966, Ser. No. 561,475
Int. Cl. F16b 33/02, 39/28; B21h 3/02
U.S. Cl. 85—47                                            4 Claims

ABSTRACT OF THE DISCLOSURE

A thread forming screw having a head, a threaded cylindrical shank and a completely circumferentially threaded tapered lead end, and the method of making the same. The root of the thread throughout the cylindrical shank and the tapered lead end is of circular cross section, while the crests of the thread on the cylindrical shank lie on an imaginary cylinder, and the crests of the thread on the tapered lead end define a polygonal cross section.

---

The present invention relates to thread forming screws and a method of making them, and more particularly to an improved thread forming screw having an improved lead end in the form of a fully threaded polygonal tapered lead end and a method of making it.

Thread forming screws are screws that may be driven into an untapped hole and which form a thread in the material defining the hole as they are driven. One form of such a screw known to the prior art has a sharp, hardened, widely spaced, coarse V-thread and is used to tap into relatively soft substances. Another known form has a relatively short threaded tapered portion at its lead end having one or more slots or grooves cut longitudinally into the taper, forming in effect a single flute tap which cuts the thread in the hole as the screw is forced into it. Recently commercially available is another form having an interrupted thread forming portion on a polygonal tapered lead end. In this latter form, a thread is formed on the tapered polygonal lead end of a screw blank in such a way as to present threaded working surfaces of less than full thread height at the points of the polygon and flat non-threaded relief portions on the flats of the polygon.

All of the prior art thread forming screws have objectionable features in application in the mass assembly industries. The coarsely threaded screw type has a tendency not to drive straight and its widely spaced V-thread does not present sufficient threaded area to the workpiece for adequate power transmission of the driving torque, thereby limiting this type to use in relatively soft materials. The longitudinally slotted or grooved self-tapping screw type forms threads in the workpiece by actually cutting the material defining the hole, thereby resulting in the production of metal chips which preclude use of this type screw in many practical applications, such as electrical uses, where such chips would be deleterious. The more recent polygonal lead end thread forming screw type having thread forming portions on their polygonal lead ends requires a relatively high driving torque to anchor them in the workpiece, as the lead end is provided with intermittent thread forming areas and flat areas.

Accordingly, it is a primary object of the present invention to provide an improved thread forming screw that can be driven into a hole in a relatively hard material, such as metal sheets, with the application of a substantially lower driving torque than that required by known thread forming screws.

Another object of the present invention is to provide an improved thread forming screw which will not cut threads in the workpiece, but rather will swage threads into the material defining the hole wall thereby causing no chips to be formed.

A further object of the present invention is to provide an improved thread forming screw that will drive straight, maintaining close thread tolerances to thereby form a secure connection, and accept standard machine screw nuts.

It is a still further object of the present invention to provide a novel improved method for forming the improved thread forming screw, in which full threads are formed on the polygonal tapered lead end of the screw so as to present threaded working areas of full thread height at the points of the polygon and threaded relief areas of less than full thread height at the flats of the polygon.

To accomplish the article aspect objects of the invention, in one form, a thread forming screw is provided which comprises: a threaded cylindrical shank; a head at one end of said shank; and a tapered polygonal lead end at the other end of said shank, said lead end having a thread completely formed thereon which provides threaded working areas of full thread height at the points of the polygon and threaded relief areas of less than full thread height at the flats of the polygon.

The method aspect object of the invention is accomplished by providing an improved method including the steps of cold heading blanks with an extruded polygonal tapered lead end, and forming threads over the entire shank, including the lead end, so as to form working threads of full height on the points of the polygon and relief threads of less than full thread height as the flats of the polygon.

Other objects and further details of that which I believe to be novel and my invention will be clear from the following description and claims taken with the accompanying drawing, wherein:

FIG. 1 is a perspective view of the lead end of a tapered thread forming screw constructed in accordance with the present invention;

FIG. 2 is an end elevational view of the lead end of the screw of FIG. 1;

FIG. 3 is a sectional view taken substantially along line 3—3 of FIG. 2; and

FIG. 4 is a side elevational view of the screw.

The improved thread forming screw generally comprises a threaded cylindrical shank 10 with a usual head 11 at one end and a tapered thread forming lead end 12 at the other end. The tapered lead end is of polygonal, preferably hexagonal, cross-section, as can be clearly seen in FIG. 2. Threads 13, of uniform peak and root diameters, are formed on shank 10. Upon the hexagonal lead end 12 are formed full circumferential threads 14 of the same axial width as the threads 13 formed on the shank 10. On the full threads, 14, which are formed on the tapered lead end, the root diameter of each thread root 15 is circular and decreases from each thread to the next adjacent thread nearest the end thereby forming a tapered helix; however, the depth of all the full radial threads is the same along the entire screw. As the threads are formed on the hexagonally shaped lead end 12, peaked thread crests 16, which comprise the working areas during thread tapping, are formed on the points of the hexagon, while relief areas 18, which are full threads formed without peaked, but flattened crests, are formed on the flats of the hexagon. Thus, the lead end of the screw of the present invention, formed with full circumferential threads over the entire lead end, but with the relief areas comprising full threads without crests, presents to the workpiece a greater thread forming working area than lead ends of the prior art intermittently threaded tapered lead end screws. The action of the improved lead end is that of swaging threads, rather than cutting them, resulting in a substantial reduction in the driving torque required to tap a hole and, thereafter, more securely anchoring the screw of the present invention in a workpiece. This is proved in practice by comparative tests of the thread forming screw of my invention and prior art screws, which have shown that the fully threaded lead end of my invention allows thread tapping to be spread out uniformly over the entire tapered lead end and reduces the driving torque required up to 30% over the polygonal tapered lead end thread forming screw having interrupted threads on its lead end, and that the improved screws produce a more secure connection.

The method used in making the improved thread forming screws of the present invention comprises: forming, as by cold heading, blanks from wire which include a shank, a head and an extruded tapered polygonal lead end; and then forming, as by pressure rolling, complete circumferential threads upon the shank and the tapered polygonal lead end. Thread rolling of the tapered end is performed on a machine having special thread dies that match the tapered lead end, thus resulting in full circumferential threads being formed on the tapered lead end that are of peaked crest, full thread height at the points of the polygon, and of flattened crest, less than full thread height at the flats. A special set of thread dies is required for each size and length screw. The formation of full circumferential threads on the tapered lead end is produced by forming these threads with a decreasing root diameter from the shank portion to the extremity of the lead end of the screw as the lateral dimension of the lead end diminishes, as shown in FIG. 3. This method produces on the lead end, threads of full height on the six points of the hexagon and threads of less than full thread height on the flats of the hexagon. It has been ascertained in practice that for screw diameters of one-quarter inch and less, to form five thread pitches on the lead end is adequate to provide the improved thread forming screw. However, the invention is not limited to any range of screw sizes.

It is understood that the present disclosure has been made only by way of example and numerous changes and details of construction and method may be resorted to without departing from the spirit and scope of the invention.

What I claim as new and desire to secure by Letters Patent of the United States is:

1. A thread forming screw comprising: a head portion; a cylindrical shank portion extending therefrom having a fully formed thread thereon of uniform depth with the crests thereof lying on an imaginary cylinder; a forwardly tapered leading end joined to said cylindrical shank portion and having a continuation of said thread thereon, the thread being continuous throughout said tapered leading end with the crests thereof being polygonal in cross section, the thread height at the points of the polygon defined by said cross section being equal to that of the thread on said cylindrical shank portion, and the portions of said thread between said points defining relief areas of a thread height less than that at said points, the root of said thread being of circular cross section throughout the cylindrical shank portion and defining a tapered helix of circular cross section throughout said tapered leading end.

2. The thread forming screw defined in claim 1 wherein the crests of the thread on the tapered leading end are hexagonal in cross section.

3. A method of forming a thread forming screw comprising the steps of: forming a headed screw blank including a cylindrical shank having a tapered lead end; forming a full radial and circumferential thread of uniform depth on the cylindrical shank, wherein the crests of the thread on the cylindrical shank lie on an imaginary cylinder, and the roots thereof are of circular cross section; and forming a continuation of said thread on said tapered lead in the form of a full circumferential thread having a continuous root that forms a tapered helix, the crests of the thread on the tapered lead end being polygonal in cross section with the thread height at the corners of the polygon being equal to the thread height on the cylindrical shank, and the portions of the thread between the corners of the polygon defining relief areas of lesser thread height.

4. The method of forming a thread forming screw defined in claim 3 wherein said thread forming operation comprises pressure rolling the threads upon the shank and the leading end, on the latter by employing thread dies that match the unthreaded tapered lead end.

References Cited

UNITED STATES PATENTS

| | | | |
|---|---|---|---|
| 2,167,559 | 7/1939 | Upson | 151—22 |
| 2,352,982 | 7/1944 | Tomalis | 151—22 |
| 3,180,126 | 4/1965 | Carlson | 85—47 |

RAMON S. BRITTS, Primary Examiner

U.S. Cl. X.R.

10—10; 151—22